United States Patent [19]

Ito

[11] Patent Number: 5,086,260
[45] Date of Patent: Feb. 4, 1992

[54] WIPER APPARATUS WITH REVERSING MOTOR PROTECTED FROM OVERLOAD

[75] Inventor: Takeshi Ito, Yokohama, Japan

[73] Assignee: Jidosha Denki Kogyo K.K., Kanagawa, Japan

[21] Appl. No.: 655,588

[22] Filed: Feb. 15, 1991

[30] Foreign Application Priority Data

Feb. 16, 1990 [JP] Japan .................................. 2-35955

[51] Int. Cl.$^5$ .................................................. H02P 3/00
[52] U.S. Cl. ............................. 318/266; 318/DIG. 2; 15/250.13
[58] Field of Search ................... 318/264–266, 318/280–286, 272, 54, 62, 443, 444, 456, 458, 465, 626, 466–469, 483, 434; 15/250.12, 250.13, 250.17; 307/10.1, 10.3; 361/23, 28, 30, 31, 33

[56] References Cited

U.S. PATENT DOCUMENTS

| | | | |
|---|---|---|---|
| 3,596,511 | 8/1971 | Hart | 318/434 |
| 4,234,833 | 11/1980 | Barrett | 318/282 |
| 4,280,160 | 7/1981 | Mori | 361/31 X |
| 4,562,387 | 12/1985 | Lehnhoff | 318/285 |
| 4,625,157 | 11/1986 | Phillimore | 318/443 |
| 4,628,234 | 12/1986 | Mizuta et al. | 318/286 X |
| 4,823,059 | 4/1989 | Compeau et al. | 318/466 X |

FOREIGN PATENT DOCUMENTS

6296154 10/1985 Japan .
 604678 4/1988 Japan .

Primary Examiner—William M. Shoop, Jr.
Assistant Examiner—A. Jonathan Wysocki
Attorney, Agent, or Firm—Sughrue, Mion, Zinn Macpeak & Seas

[57] ABSTRACT

A wiper apparatus is provided with a wiper motor, an overcurrent detection circuit, a timer actuated according to a signal output from the overcurrent detection circuit at the time of detecting the overcurrent flowing in the wiper motor and a controller for actuating a wiper blade reciprocatingly by rotating the wiper motor in the reverse direction every time the wiper blade arrives at a turning position, and rotating the wiper motor in the reverse direction when the overcurrent detection circuit continues to detect the overcurrent for a period predetermined by the timer. According to this invention, it is possible to prevent the wiper motor from the burning out even if the wiper blade of the wiper apparatus is restricted by obstacles such as snow lying on the vehicle body.

2 Claims, 6 Drawing Sheets

WIPER APPARATUS WITH REVERSING MOTOR PROTECTED FROM OVERLOAD

BACKGROUND OF THE INVENTION

1. Field of the Invention

This invention relates to a wiper apparatus used for wiping a wiped surface, for example, a windshield of a motor vehicle and, more particularly to a wiper control for actuating a wiper blade reciprocatingly by changing a rotational direction of a wiper motor.

2. Description of the Prior Art

Heretofore, there has been used a wiper apparatus having structure that rotational motion of a wiper motot in one-way direction is converted into reciprocating motion of a wiper blade through a wiper linkage.

And, a wiper apparatus is disclosed in Japanese Patent Publication No. 60-4678/85 (Kokoku), which has structure that a wiper blade is droven reciprocatinly by changing a rotational direction of a wiper motor when the wiper blade arrives at the predetermined turning position without using the wiper linkage.

In a wiper apparatus is disclosed in Japanese Patent Disclosure No. 62-96154/87 (Kokai), which has structure that a wiper motor may be released from its restricted state by shifting a lower turning position of a wiper blade and changing a wiping area of the wiper blade in order to solve a problem in that the wiper motor is sometimes damaged owing to overheating caused by an overcurrent flowing in the wiper motor when the wiper blade is restricted to move by snow lying in a lower turning position (on the side of the stop position) of the wiper blade in case of snowfall.

However, in the conventional wiper apparatus disclosed in the Japanese Patent Disclosure No. 62-96153/87, there is a limit in changeable range of the wiping area of the wiper blade, therefore, there is not consideration about a case the wiper blade is obstructed to move in the position beyond the changeable range of the wiping area by snowfall in large quantity, for example.

And, the improvement disclosed in the aforementioned Japanese Patent Disclosure No. 62-96153/87 is devised for a wiper apparatus having the structure that the rotational motion of the wiper motor in one-way direction is converted into the reciprocating motion of the wiper blade through the wiper linkage. In a wiper apparatus of a type of changing the rotational direction of a wiper motor and having a wiping angle of 180 degrees or so, there is a problem since there is the possibility that the wiper blade is obstructed to move by snow laying in the turning position on the opposite side of the stop position of the wiper arm.

SUMMARY OF THE INVENTION

This invention is made in view of the problems of the aforementioned conventional wiper apparatus, it is an object to provide a wiper apparatus which is possible to prevent the wiper motor from the burning out by detecting the restriction of the wiper blade and changing the rotational direction of the wiper motor.

The construction of the wiper apparatus according to this invention for attaining the aforementioned object is characterized by comprising a wiper motor for driving a wiper blade, an overcurrent detection means for detecting an overcurrent flowing in the wiper motor, a timer means actuated according to a signal output from the overcurrent detection means when the overcurrent is detected by the overcurrent detection means, and a control means for actuating the wiper blade reciprocatingly by rotating the wiper motor in the reverse direction every time the wiper blade arrives at a predetermined position, and for rotating the wiper motor in the reverse direction when the overcurrent detection means continues to detect the overcurrent flowing in the wiper motor for a period predetermined by the timer means.

In a wiper apparatus according to aspects of this invention, it is preferable that aforementioned timer means comprising a first timer means actuated according to a signal output from the overcurrent detection means when the overcurrent detection means detects the overcurrent flowing in the wiper motor, and a second timer means actuated according to a signal output from the overcurrent detection means when the overcurrent detection means detects the overcurrent again after reversing the wiper motor by detecting the overcurrent continuing for a period predetermined by the first timer means, and further preferable that a period predetermined by the second timer means is shorter than the period predetermined by the first timer means.

In the wiper apparatus according to this invention, the overcurrent detecting means detects that the wiper blade is obstructed to move and the wiper motor falls into the restraint state by sensing the overcurrent flowing in the wiper motor, and the control means is so designed as to rotate the wiper motor in the reverse direction when the restraint state of the wiper motor is maintained as long as the predetermined period of time set by the timer means. Therefore, the wiper motor is released from the restraint state by the reversion of the wiper blade.

In the wiper apparatus according to preferred aspects which is provided with a timer means consisting of the first and second timer means, the control means controls the wiper motor so as to rotate in the reverse direction when the restricted state of the wiper motor is maintained again as long as the period predetermined by the second timer means shorter than the period predetermined by the first timer means after reversing the rotation of the wiper motor by sensing the overcurrent flowing in the wiper motor. Therefore, the wiper apparatus is so controlled as to reduce the damage of the wiper motor in some degree by reducing the amount of time for which the overcurrent flows in the wiper motor at the case in which obstacles are not removed from the wiping surface and the wiper blade is obstructed to move at the same position in which the wiper blade is obstructed at previous time.

DESCRIPTION OF THE PREFERRED EMBODIMENT

A wiper apparatus according to an embodiment of this invention will be explained below on basis of FIG. 1 to FIG. 5.

Figure 1:
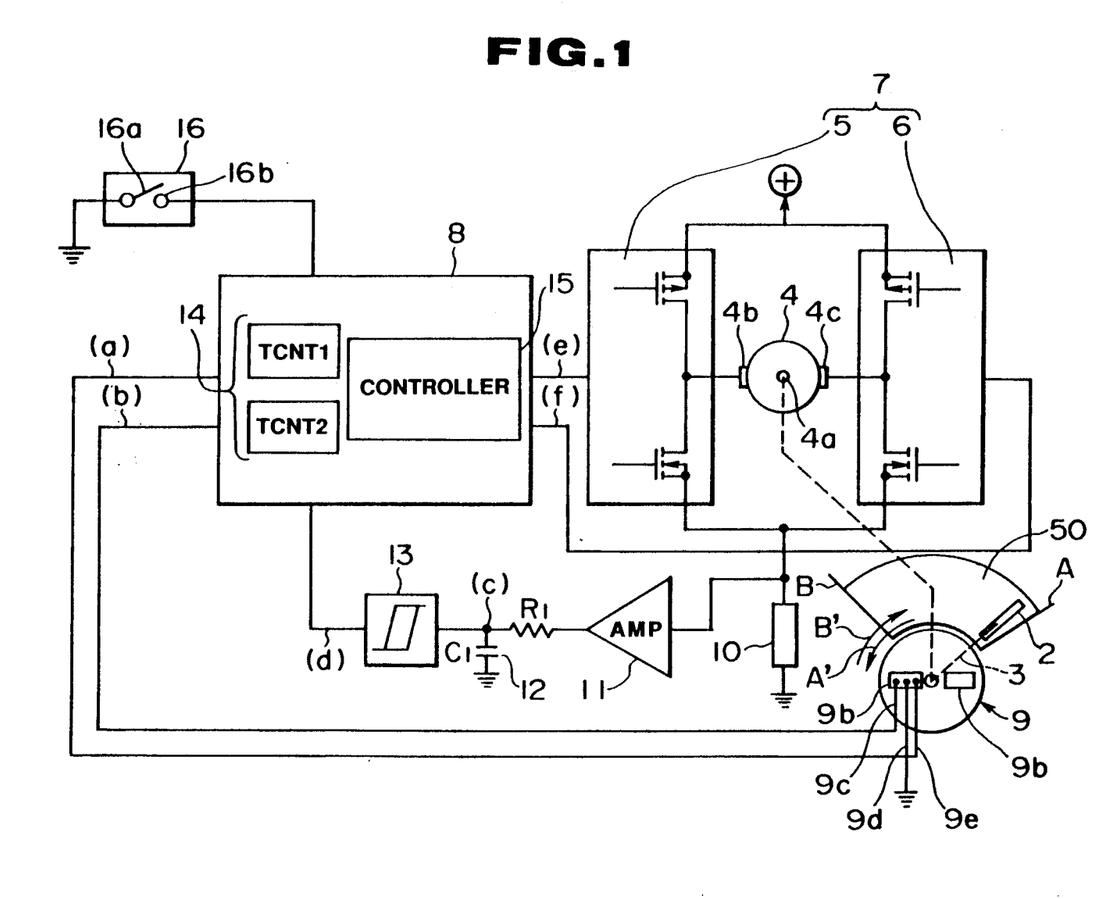
FIG. 1 is a functional block diagram illustrating construction of the wiper apparatus according to an embodiment of this invention.

FIG. 1 is a functional block diagram of the wiper apparatus according to an embodiment of this invention.

In the illustrated wiper apparatus 1, an output shaft 4a of a wiper motor 4 is secured to a base end of the wiper arm 3 fitted with a wiper blade 2 at its top end, and power terminals 4b and 4c provided to the wiper motor 4 are connected with a drive circuit 7 consisting of power switches 5 and 6.

The wiper motor 4 is so designed as to rotate in the forward or the reverse direction by changing the power switches 5 and 6, the drive circuit 7 rotates the wiper motor 4 so as to move the wiper blade 2 from a stop position A toward a turning position B on the opposite side on a wiping surface 50 (in the direction of the arrow A' in FIG. 1) when a command signal (e) input from a control part 8 is H (high-level), and rotates the wiper motor 4 so as to move the wiper blade 2 from the turning position B toward the stop position A on the wiping surface 50 (in the direction of the arrow B' in FIG. 1) when a command signal (f) input from control part 8 is H (high-level).

The command signals (e) and (f) are output from the controller 15 (control means) provided in the control part 8 together with a timer 14 (timer means), and are input to the power switches 5 and 6 as drive control signals.

The output shaft 4a of the wiper motor 4 is provided with a position detector 9, the position detector 9 is provided with a insulative plate 9a linking with the output shaft 4a, a conductive part 9b and a conductive part 9b' which is shorter than conductive part 9b each of which is disposed on the insulative plate 9a at two places, and contacts 9c, 9d and 9e to be contacted with or to be discontacted from the conductive parts 9b, respectively.

And, the position detector 9 is formed so as to output position signals (a) and (b) into the control part 8 as position information of the wiper blade 2 according to the contact of the contacts 9c, 9d and 9e with the conductive parts 9b, or the disconnect of the contacts 9c, 9d and 9c from the conductive parts 9b, the both position signals (a) and (b) change to L (low-level) when the wiper blade 2 is in the stop position A and the position signal (a) changes to L (low-level) when the wiper blade 2 is in the turning position B. This is because the contact 9c does not contact with the conductive part 9b' but rather the contact 9e contacts the conductive part 9b' and is grounded through the contact 9d.

On the grounded side of the power switches 5 and 6, a detection resistor 10 is connected for detecting a motor current flowing in the wiper motor 4, and a signal obtained by the detection resistor 10 is input to the control part 8 through an amplifier 11, an integration circuit 12 formed with a capacitor C1 and resistor R1, and a schmitt circuit 13 as an overcurrent signal (d). These elements form an overcurrent detection circuit (overcurrent detection means), in which the overcurrent signal (d) changes to H (high-level) when the overcurrent flows in the wiper motor 4.

The control part 8, as mentioned above, is provided with the controller 15 actuated by processing the overcurrent signal (d) output from the overcurrent detection circuit and the position signala (a) and (b), and the controller 15 for reversing the rotation of the wiper motor 4 when the wiper blade 2 arrives at the turning position (stop position A and turning position B) and when the overcurrent signal (d) of H (high-level) is detected as long as a period predetermined by the timer 14.

And the timer 14 consists of a first timer TCNT1 actuated in response to the overcurrent signal (d) of H (high-level) output from the overcurrent detection circuit and a second timer TCNT2 actuated in response to the overcurrent signal (d) of H (high-level) output again from the overcurrent detection circuit after reversing the wiper motor 4 according to the detection of the overcurrent flowing in the wiper motor 4, and the set time predetermined by the second timer TCNT2 is shorter than the set time predetermined by the first timer TCNT1.

The control part 8 is connected with an operation switch 16, the operation switch 16 is changed on by contacting a movable contact 16a with a fixed contact 16b of the operation switch 16.

Next, operation of the aforementioned wiper apparatus 1 will be explained below on basis of FIG. 2 to FIG. 5.

Figure 2:
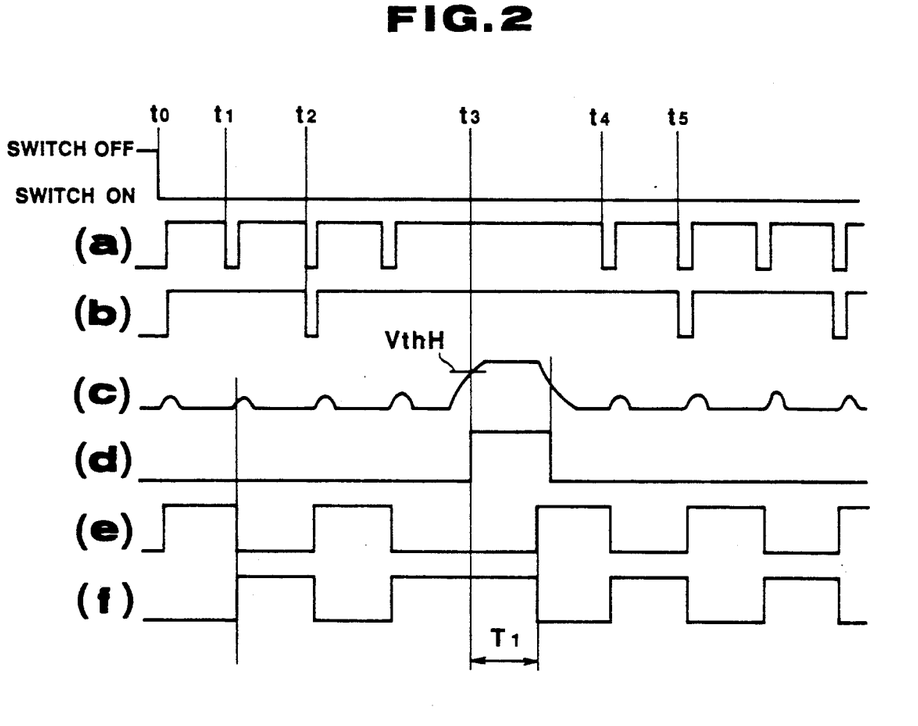
FIG. 2 is a time chart explaining the operation of the wiper apparatus shown in FIG. 1.

FIG. 2 is a time chart for explaining the operation of the wiper apparatus 1.

Namely, switching on the operation switch 16 at time $t_0$, the controller 15 drives the wiper motor 4 in the direction of the arrow A' by making the command signal (e) into H (high-level).

Thereby, the wiper blade 2 leaves from the stop position A, the position signals (a) and (b) change to H (high-level).

In this time, a starting current flows in the wiper motor 4 temporarily and an excess current is detected by the detection resistor 10, however the output from the amplifier 11 is integrated by the integration circuit 12 and does not reach to a threshold level of the schmitt circuit 13 (VthH shown in FIG. 2), therefore the overcurrent signal (d) is maintained in L (low-level)

At time $t_1$, the wiper blade 2 arrives at the turning position B, thereby the position signal (a) changes into L (low-level).

When the position signal (a) of L (low-level) is input to the control part 8, the controller 15 reverses the rotation of the wiper motor 4 and drives the wiper blade 2 toward the stop position A from the turning poisition B in the direction of the arrow B' shown in FIG. 1 by making the command signal (e) into L (low-level) and changing the command signal (f) into H (high-level).

Figure 3A:
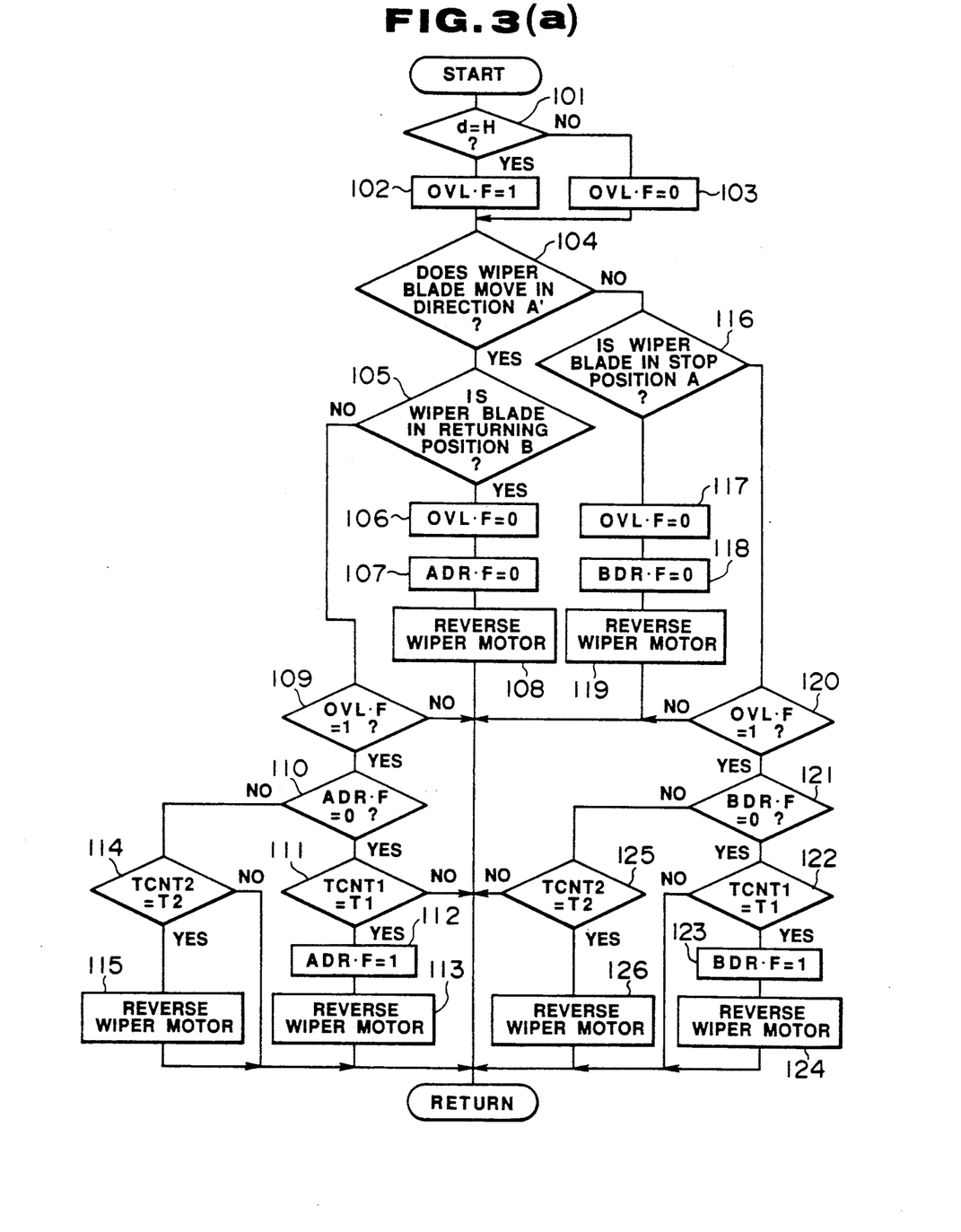
FIG. 3(a) is a flow chart explaining the control of the wiper apparatus shown in FIG. 1.
Figure 3B:
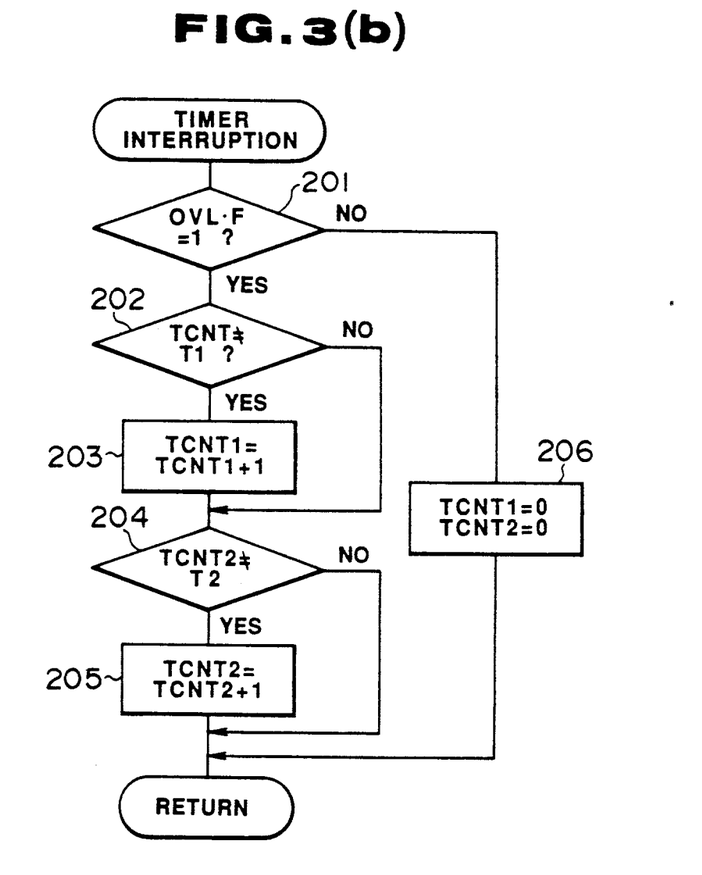
FIG. 3(b) is a flow chart explaining the timer interruption routine.

Explaining the operation of the controller 15 at time $t_1$ on basis of the flow chart shown in FIG. 3(a), the controller 15 judges whether or not the wiper blade 2 arrives at the turning position B according to the levels of the position signals (a) and (b) at step 105, and executes a reversing process of the wiper motor 4 at step 108.

At time $t_2$, the wiper blade 2 arrives at the stop position A and the position signals (a) and (b) change to L (low-level) respectively. Thereby, the controller 15 judges that the wiper blade 2 is in the stop position A at step 116, and reverses the wiper motor 4 at step 119 by executing the reversing process, that is by changing the command signal (e) into H (high-level), and changing the command signal (f) into L (low-level).

The controller 15 makes the wiper blade 2 to move reciprocatingly by repeating the operations from time $t_0$ to time $t_2$ under ordinary circumstances as mentioned above.

In the case the wiper blade 2 is obstructed to move by foreign substances attached on the wiping surface 50 when the wiper blade 2 moves in the direction of the arrow B', for example, a voltage drop is caused by an overcurrent flowing in the wiper motor 4. The voltage is amplified by the amplifier 11 and raises a voltage level at point (c).

When the voltage at point (c) exceeds the threshold level $Vth_H$ of the schmitt circuit 13 at time $t_3$, the overcurrent signal (d) changes to H (high-level) and is input to the control part 8.

The controller 15 in the control part 8 makes OVL flag (overload flag) into "1" according to the input of the overcurrent signal (d) of H (high-level) at step 101.

In step 104, the rotational direction of the wiper motor 4 is judged, and control proceeds to step 116 since the wiper motor 4 rotates in the direction shown with the arrow B' (command signal (e) is L, signal (f) is H).

In step 116, judgement is done as to whether the wiper blade 2 arrives at the stop position A or not, control proceeds to step 120 by judging that the wiper blade 2 does not arrive to the stop position A because the position signals (a) and (b) are both H (high-level).

In step 120, judgement is done as to whether or not the wiper motor 4 is in its overloaded state referring to the value of the OVL flag.

The wiper motor 4 is in the overloaded state when the OVL flag is "1", and is in its ordinary state when the OVL flag is "0", control proceeds to step 121 judging that the wiper motor 4 is in the overloaded state because the OVL flag is set into "1" at the aforementioned step 102.

In step 121, control proceeds to step 122 referring to a value of BDR flag because the BDR flag is cleared at step 118 when the wiper blade 2 arrives at the stop position A at time $t_2$.

In step 122, judgement is done as to whether or not the time predetermined by the first timer TCNT1 elapses. The value of the first timer TCNT1 is renewed in a timer interruption routine shown in FIG. 3(b) which is excuted at intervals of given period of time as a interruption handling. The OVL flag is referred at step 201 of the timer interruption routine, the first timer TCNT1 is added with "1" within the range of up to T1 every time the interruption is repeated if the OVL flag is "1" at step 202 and step 203. The second timer TCNT2 is also added within the limits of up to T2 at step 204 and step 205 in the same manner as the first timer TCNT1. When the OVL flag is "0" (the wiper motor 4 does not fall into the overloaded state) at step 201, the first timer TCNT1 and the second timer TCNT2 are cleared at step 206, respectively. Therefore, if a cycle of the execution of the timer interruption handling is 1 second, the value of the first timer TCNT1 amounts to T1 when the overloaded state of the wiper motor 4 is maintained for T1 seconds after the wiper motor 4 falls into the overloaded state and the OVL flag is set with "1".

When judgement is done that the value of the first timer TCNT1 amounts to T1 at step 122, control proceeds to step 123 and the BDR flag is set into "1", further the wiper motor 4 is reversed in the direction of the arrow A' at step 124.

Accordingly, the wiper apparatus 1 is so structured that the wiper motor 4 may be released from the restricted state by reversing the wiper blade 2 after T1 seconds even if the wiper blade 2 is obstructed to move by foreign substances and the overcurrent flows in the wiper motor 4.

Hereafter, the wiper blade 2 arrives in the turning position B at time $t_4$, processes from step 105 to steps 106 and 107 are executed, and the wiper motor 4 is reversed at step 108. If the wiper blade 2 arrives in the stop position A without obstruction caused by foreign substances at time $t_5$, processes from step 116 to step 117 are executed, the BDR flag is cleared at step 118 and the wiper motor 4 is reversed in the direction of the arrow A' shown in FIG. 1. Then movements of the wiper apparatus 1 is restored to normalcy.

Explanation will be given about the operation in a case the wiper blade 2 is obstructed to move by snow lying on the vehicle body as an example of abnormal operation.

Figure 4A:
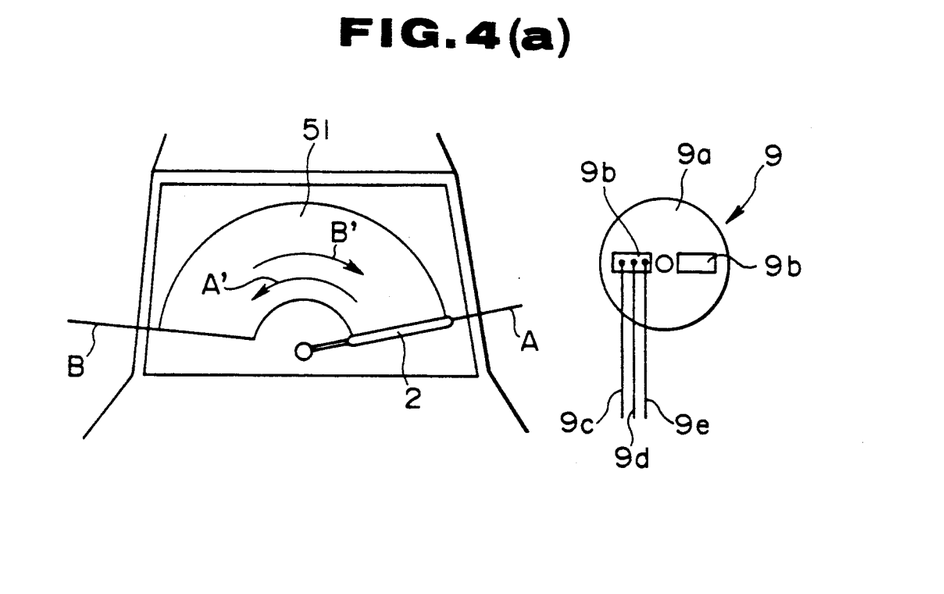
FIG. 4(a) and FIG. 4(b) are illustrations showing positional relations between the wiper blade and the position detector at the time of snowfall in the wiper apparatus shown in FIG. 1.
Figure 4B:
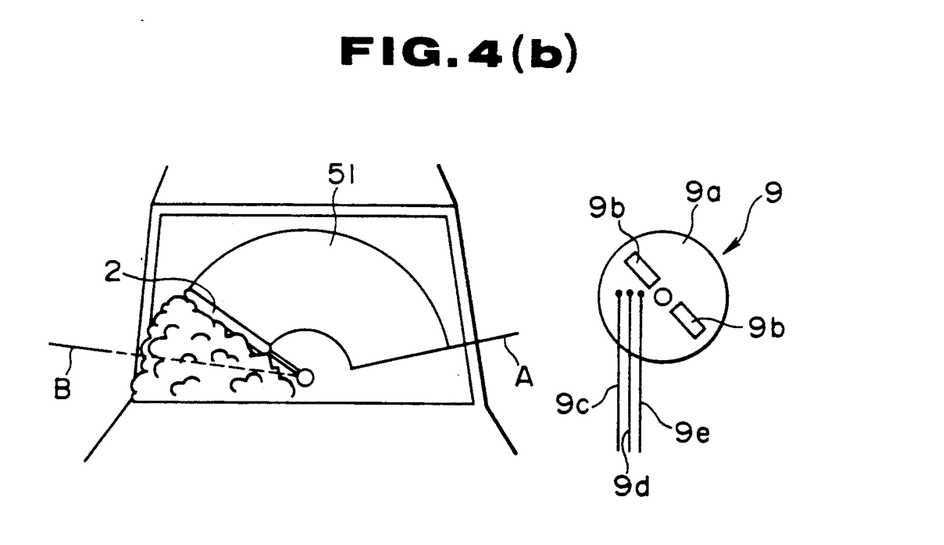

FIGS. 4(a) and 4(b) show positional relations between the wiper blade 2 and the position detector 9 at a case in which snow lies on a rear windshield 51. FIG. 4(a) shows a state in which the wiper blade 2 is in the stop position A, and FIG. 4(b) illustrates a state in which the wiper blade 2 is impossible to arrive at the turning position B owing to the snow deposited in the vicinity of the turning position B by pressing the snow lying on the rear windshield 51 toward the turning position B with the wiper blade 2 at the beginning of wiping.

Figure 5:
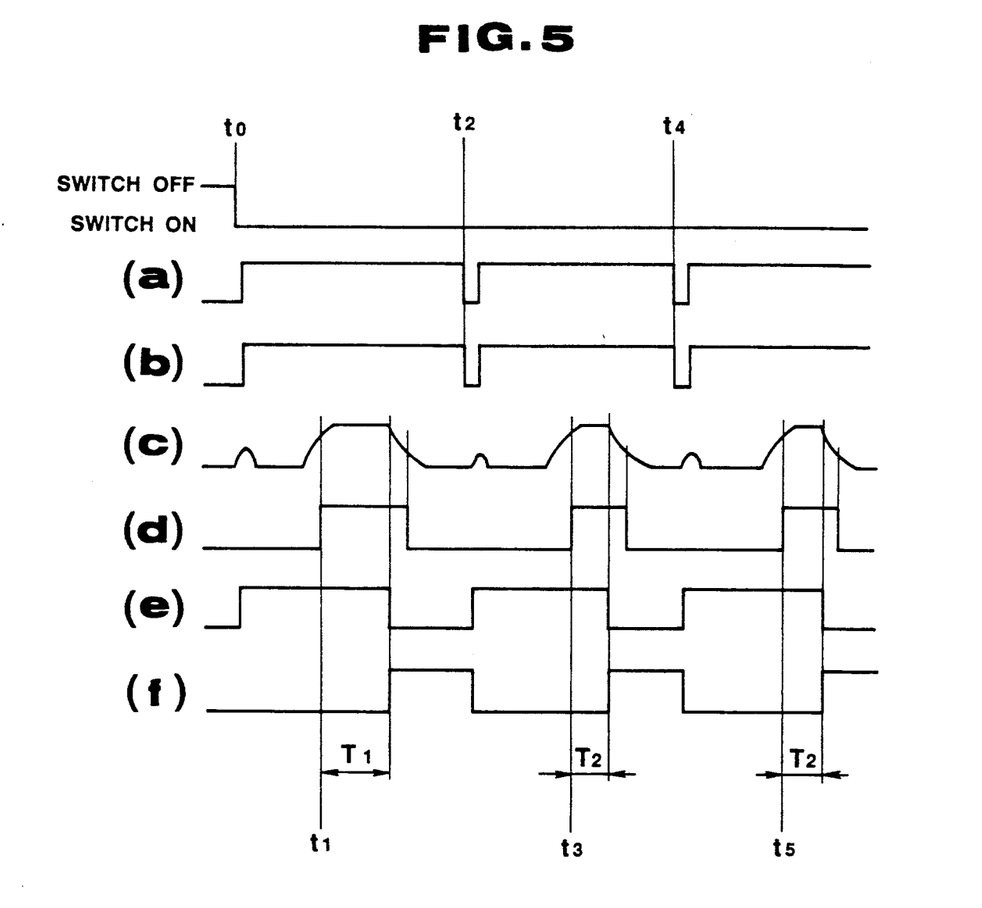
FIG. 5 is a time chart explaining the operation of the wiper apparatus shown in FIGS. 4(a) and 4(b).

The operation under the aforementioned conditions will be described below on basis of a time chart shown in FIG. 5.

Switching on the operation switch 16 at time $t_0$, the wiper motor 4 rotates so as to drive the wiper blade 2 from the stop position A toward the turning position B in the direction of the arrow A' shown in FIG. 4(a).

At time $t_1$, the wiper blade 2 is obstructed to move by the snow lying in the vicinity of the turning position B, and the overcurrent signal (d) changes to H (high-level) because the voltage level at point (c) is raised by an overcurrent flowing in the wiper motor 4.

The controller 15 in the control part 8 sets the OVL flag into "1" at step 102 according to the overcurrent signal (d) is H (high-level).

And in step 104, judgement is done that the wiper motor 4 rotates in the direction of the arrow A' (command signal (e) is H, signal (f) is L), and control proceeds to step 105. In step 105, judgement is done that the wiper blade 2 is not in the turning position B and control proceeds to step 109 because the wiper blade 2 is impossible to arrive at the turning position B and the position detector 9 outputs position signals (a) and (b) of H (high-level). Control proceeds to step 110 from step 109 since the OVL flag is set into "1", judgement is done as to whether the value of the first timer TCNT1 is T1 or not at step 111 because ADR flag is "0".

Control proceeds to step 112 after T1 seconds, the ADR flag is set into "1", and the wiper motor 4 is reversed at step 113.

At time $t_2$, the wiper blade 2 arrives at the stop position A, and the wiper motor 4 is reversed normally.

At time $t_3$, the wiper blade 2 is obstructed again by the snow, the overcurrent signal (d) changes to H (high-level) owing to the overcurrent flowing in the wiper motor 4.

In this time, control proceeds to step 114 from step 110 because the ADR flag is maintained to be set since previous abnormal reversion caused by the snow.

In step 114, judgement is done as to whether the value of second timer TCNT2 is T2 or not.

In step 115, the wiper motor 4 is reversed after T2 seconds. In this time, the upper limit value T2 of the second timer TCNT2 is set shorter than the upper limit T1 of the first timer TCNT1 lest the overcurrent should flow in the wiper motor 4 for a long time.

Hereafter, the wiper blade 2 is reversed normally at time $t_4$, and also reversed after T2 seconds when the wiper blade 2 is restricted at time $t_5$.

Namely, the controller 15 judges that the obstacle causing the first abnormal reversion is not removed from the rear windshield 51, the wiper apparatus 1 is so designed as to reverse the wiper motor 4 earlier than the reversion at the first time by detecting the restriction of the wiper blade 2 after the first time. Further, it is possible to use the capacity of the wiper motor 4 more efficiently, i.e., without waste, and to reduce the possibility of damage to the wiper motor 4. This is because the period of the overcurrent decreases.

When the obstacle is removed, e.g., by removing the snow, and the wiper blade 2 arrives at the turning position B, the ADR flag is cleared by executing the processes from step 105 to steps 106 and 107. Accordingly, judgement is done by referring the value T1 predetermined by the first timer TCNT1 as to whether the wiper blade 2 falls into the restricted state or not when the wiper blade 2 is obstructed again after this.

Although the explanation is given about the operation at the case in which the wiper blade 2 moves in the direction of the arrow A' in FIG. 4(a), it is possible to control the wiper motor 4 at the same time and in the same manner as mentioned above by executing the processes after step 116 in accordance with the judgement at step 104 even when the wiper motor 4 falls into the restricted state in the case the wiper blade 2 moves in the direction of the arrow B'.

As described above, the wiper apparatus according to this invention comprises a wiper motor for driving a wiper blade, an overcurrent detection means for detecting an overcurrent flowing in the wiper motor, a timer means actuated according to a signal output from the overcurrent detection means when the overcurrent is detected by the overcurrent detection means, and a control means for actuating the wiper blade reciprocatingly by rotating the wiper motor in the reverse direction every time the wiper blade arrives at a predetermined position, and for rotating the wiper motor in the reverse direction when the overcurrent detection means continues to detect the overcurrent flowing in the wiper motor for a period predetermined by the timer means. Therefore, an excellent effect can be obtained since it is possible to keep the visual range for the driver favorable because the wiper blade continues to wipe the windshield surface without falling into its restricted state.

What is claimed is:

1. A wiper apparatus comprising:
   a wiper motor for driving a wiper blade;
   an overcurrent detection means for detecting an overcurrent flowing in said wiper motor;
   a timer means actuated according to a signal output from the overcurrent detection means when the overcurrent is detected by said overcurrent detection means; and
   a control means for actuating the wiper blade reciprocatingly by rotating the wiper motor in the reverse direction every time the wiper blade arrives at a predetermined position, and for rotating said wiper motor in the reverse direction when the overcurrent detection means continues to detect the overcurrent flowing in the wiper motor for a period predetermined by said timer means;
   said timer means comprising a first timer means actuated according to a signal output from the overcurrent detection means when said overcurrent detection means detects the overcurrent flowing in the wiper motor, and a second timer means actuated according to a signal output from the overcurrent detection means when said overcurrent detection means detects the overcurrent again after reversing the wiper motor by detecting the overcurrent continuing for a period predetermined by said first timer means.

2. A wiper apparatus as set forth in claim 1, wherein a period predetermined by said second timer means is shorter than the period predetermined by said first timer means.

* * * * *